Dec. 13, 1927.
F. J. KENT
ELECTRIC CONDENSER
Filed March 30, 1925
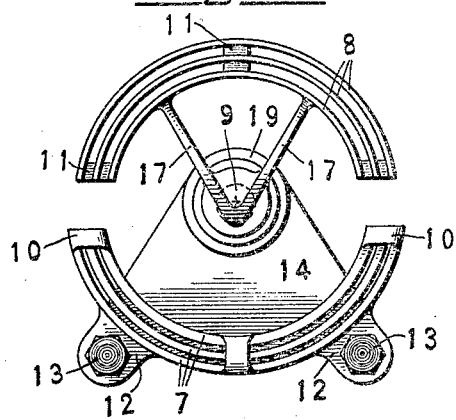
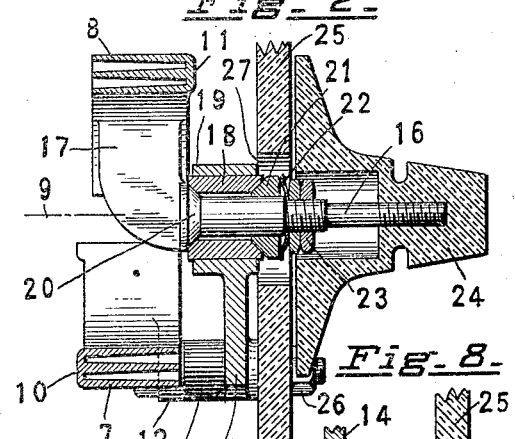
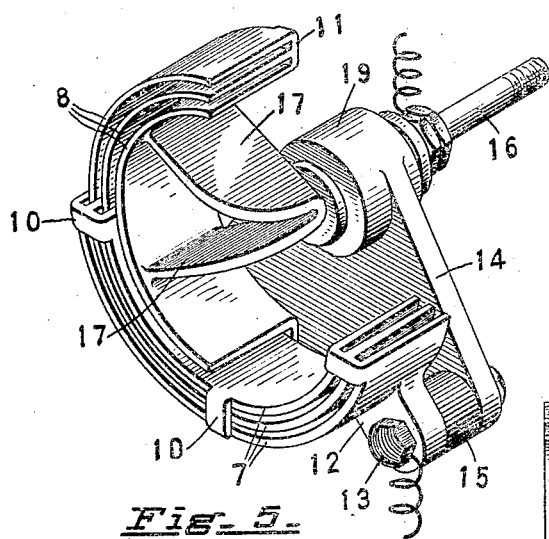
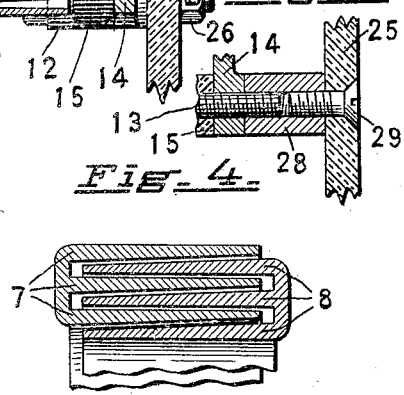
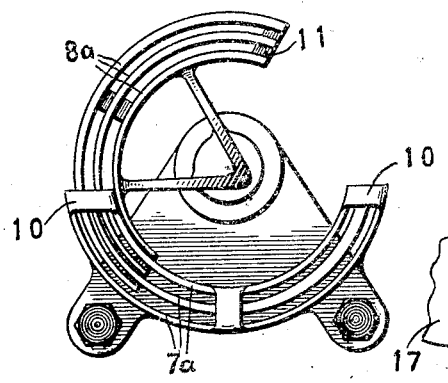
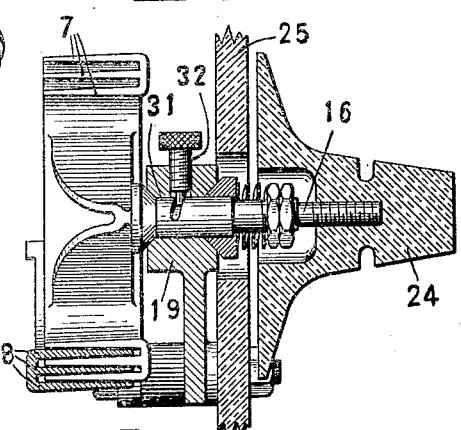
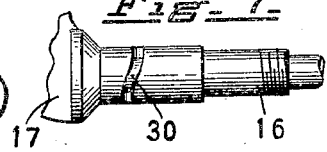
INVENTOR Patented Dec. 13, 1927.

1,652,863

UNITED STATES PATENT OFFICE.

FRANK J. KENT, OF VERONA, NEW JERSEY, ASSIGNOR, BY MESNE ASSIGNMENTS, TO UNITROL CONDENSER CORPORATION, OF NEW YORK, N. Y., A CORPORATION OF DELAWARE.

ELECTRIC CONDENSER.

Application filed March 30, 1925. Serial No. 19,338.

One of the requirements of an effective condenser is that the plates be quite closely spaced. As condensers are constructed at present this requirement leads to frequent faults because in the forms of condensers now on the market, the plates are easily bent or deformed, causing short circuits and other faults, difficult or impossible to correct. The present-day condensers, furthermore, are usually made up of a considerable number of separate parts which must be assembled with care and skill, and as these qualities are variable with different operatives the products naturally vary accordingly.

Some of the more important objects of this invention are to eliminate these objections, that is, to provide a condenser in which the plates will be permanently spaced in proper close relation and in which each set of plates will be a complete integral unit of a fixed, as distinguished from an uncertain or variable value.

Further objects are to provide a condenser capable of extremely fine adjustment, having high capacity values and free of electrical losses.

The foregoing and other objects are attained in part by a novel construction of condenser elements and involving arcuate plates, interleaving on arcuate lines, said plates being formed on arcs having a common center and the movable plate or set of plates being carried by a shaft whose axis corresponds with this center. Each set of plates is preferably constructed as a single integral unit and these plates may be slightly tapered or continued on slightly eccentric lines so that with a relative movement of the two sets of plates, a bodily approach and separation may be accomplished to effect a very gradual variation of the capacity.

Other novel features of the invention will appear as the specification proceeds.

In the drawing accompanying and forming part of this specification, one of the practical commercial embodiments of the invention is illustrated, but it should be understood that the structure may be modified and changed in various respects without departure from the broad spirit and scope of the invention as hereinafter defined and claimed.

Figure 1 is a rear view of the condenser.

Figure 2 is a vertical cross sectional view of the same as mounted on a supporting panel.

Figure 3 is a perspective view illustrating the interleaving action of the condenser plates.

Figure 4 is an enlarged fragmentary cross sectional view of the interleaved sets of plates.

Figure 5 is a rear view showing the plates as longitudinally tapered to effect an automatic approach in the rotative adjustment of the elements.

Figure 6 is a vertical section and Figure 7 is a broken detail of means for effecting a bodily to and fro adjustment of the plates.

Figure 8 is a fragmentary section of means for spacing the condenser at the back of a supporting panel.

The particular condenser illustrated is made up of a set of three stationary plates 7 and a set of three cooperating interleaving movable plates 8. All these plates are in the form of arcuate segments of cylinders of different diameters but having a common axis 9. This axis is the center about which all the plates are concentrically grouped.

The stationary plates are shown connected together at the back by integrally formed lugs 10 disposed at the ends and at an intermediate point in the length of the plates. These connections hold the intermediate and end portions of the plates definitely spaced and the curvature of the plates imparts to them a certain rigidity so that the spacing may be such as to afford very small clearances, with the assurance that these clearances will be permanent.

In similar fashion, the movable plates are shown connected at the back at intermediate and end points by integral lugs or bridges 11 which, with the rigidified character of the plates, assures a permanency of spacing and a maintainance of the fine clearances originally fixed. It will be noted that the connecting lugs or bridges are disposed at the outer edges of the two sets of intermeshing plates and so do not interfere with the meshing action of the plates.

The set of stationary plates is shown as supported through lugs 12 projecting substantially radially from the outermost plate and screws 13 extending through these lugs and engaged with the lower corners of a substantially triangular base plate 14.

The present embodiment is of the so-called "grounded rotor" type and accordingly the stationary set of plates is shown as insulated from the supporting base by having the supporting screw 13 made of insulating material and by interposing an insulating washer or spacer 15 between the plate lugs 12 and the base.

The movable set of plates is shown as carried by a shaft 16 journaled in the upper corner of the substantially triangular base with its axis corresponding to the axis of the concentric plates. Substantially radial arms 17 extending from the inner end of this shaft on divergent angles to the inner movable plate form the means of connection between the shaft and movable set. This connection, as shown in Figure 1, provides a V-shaped truss which further braces the movable plates.

The shaft bearing is shown as a bearing sleeve 18, set in a hub 19 formed in the upper corner of the base; said sleeve having conical end faces engaged respectively by a bearing cone 20 on the end of the shaft and an oppositely facing cone 21 engaged on the shaft and acted on by a spring or spring washer 22, the tension of which is adjustable by nuts 23 screwed on the shaft. It will be seen that by adjusting the spring tension at this point the loose cone 21 can be made to engage its seat in the end of the bearing sleeve with variable pressure and so the tension at which the rotor will be held in adjusted position can readily be fixed to suit different requirements. In all adjustments, however, the rotor is accurately centered so as to interleave the stationary plates without contacting.

A suitable knob or other operating member 24 may be secured on the outer end of the rotor shaft. Also, any suitable means may be provided for mounting the condenser. In the illustration, as shown in Figures 2 and 6, the supporting screws 13 are utilized for this purpose by making such screws long enough to project through the panel 25 or other support and engaging fastening nuts 26 on the protruding ends of the screws at the front of the panel. As shown in these views, where the condenser is secured closely against the back of the panel, it may be necessary to make the shaft opening 27 in the panel large enough to take a portion of the hub structure of the condenser. The necessity for this large opening may be avoided, however, by spacing the condenser back of the panel, as indicated in Figure 8, by the interposition of spacing sleeves 28 screwed on the protruding ends of the supporting screws 13 and receiving supporting screws 29 passed through the front of the panel.

The desired integrality of parts is obtained in the present disclosure by casting or molding the stator with its connecting and supporting lugs as one unit and the rotor with its connecting lugs, supporting arms and shaft all as another unit. When so made, the plates are formed with a "draw" or taper as indicated most clearly in Figures 2 and 4, and this wedge-like structure permits of a further and finer relative adjustment by a bodily shifting or "nesting" movement of the plates. In Figure 6 this bodily shifting movement is effected by providing a cam slot 30 in the condenser shaft engaged by a relatively stationary pin 31. This pin is shown as carried by a screw 32 adjustably mounted in the shaft bearing so that it may be advanced or retracted according as to whether or not this extra or vernier adjustment is to be employed. It will be understood that the cam shoulders may be positioned to effect the bodily adjustment at any point in the rotary shifting of the plates, for instance, at the "short wave" end of the condenser action where finer adjustments are necessary.

In the structure illustrated in Figure 5, a vernier effect is automatically introduced in the rotary adjustment of the condenser by making the movable plates taper longitudinally in thickness, as indicated at $8^a$, and the stationary plates $7^a$ as reversely tapered so that there will be a gradual approaching of the opposed surfaces as the condenser is adjusted toward maximum capacity.

The arcuate extent of the segmental plates may be varied to suit different requirements, but usually each set of plates will be somewhat less than 180 degrees so as to enable an approach to zero capacity. The number and size of the plates also may vary to suit different values required and the integrality of the respective condenser elements makes this readily practicable because one or any number of plates may as easily be cast or molded, connected as indicated, on various arcs and in different lengths or widths. The structure as a whole is compact and size considered, has a high capacity value, losses are reduced to a minimum and the variations in adjustment are uniform. The means shown for effecting relative movement of translation of the condenser elements imposes certain limitations of adjustments but if desired, a free and unrestricted relative bodily movement of the condenser elements may be provided for, whereby they may be manually adjusted through an infinite range. Thus the rotor element may be shifted relatively to the stator by suitable means entirely independently of the relative rotative adjustment of the two elements, as by shifting the rotor shaft longitudinally for finer or vernier settings, after approximate adjustment has been effected by rotation of the shaft.

It will also be clear that the automatic adjustment provided by the cam or equivalent may be calculated and be brought into operation at such a time as to give the condenser the effect of a "straight line" curve or to make the adjustments for different wave lengths of equal extent throughout the entire range or throughout a certain portion of the range of the condenser.

What is claimed is:

1. In a device of the character disclosed, interleaving substantially cylindrical and concentric plate segments arranged in two overlapping groups, each group comprising integrally united elements and said elements being supported for relative rotative adjustment about the axis common to both groups, said cylindrical plate segments of the two groups being reversely tapered transversely in cross section and joined together at the thicker portions of the same and means for effecting a bodily translation of the two sets of elements in addition to the relatively rotative adjustment of the same.

2. In a device of the character disclosed, interleaving substantially cylindrical and concentric plate segments arranged in two overlapping groups, each group comprising integrally united elements and said elements being supported for relative rotative adjustment about the axis common to both groups, said cylindrical plate segments being tapered transversely in cross section and joined together at the thicker portions of the same and means for automatically effecting a bodily translation of the two sets of plates in the course of the rotative adjustment of the same.

3. In a device of the character disclosed, interleaving substantially cylindrical and concentric plate segments arranged in two overlapping groups, each group comprising integrally united elements and said elements being supported for relative rotative adjustment about the axis common to both groups, said cylindrical plate segments being tapered transversely in cross section and joined together at the thicker portions of the same, means for automatically effecting a bodily translation of the two sets of plates in the course of the rotative adjustment of the same and means for rendering said automatic translation mechanism operative or inoperative.

4. In a device of the character disclosed, concentrically curved interleaving plate segments arranged in two groups with the plates of one group relatively rotatable in respect to the other group about the common axis of the two groups, the plates of the two groups being transversely tapered in reverse directions and arranged with the thicker edges outermost, integral connections extending across the backs of said outermost thicker edges, a supporting shaft for the movable group of plate segments and supporting arms extending substantially radially therefrom to the inner curved surface of the inside movable plate and forming a V-shaped truss carrying the movable group of segments.

5. In a device of the character disclosed, two concentrically related groups of interleaving curved plate segments, a supporting shaft for one group of segments located at the common axis of the two groups and a cam and cooperating pin associated with said shaft whereby in the rotative adjustment of said shaft the movable group of segments will be automatically bodily shifted transversely toward and away from the other group of segments.

6. In a device of the character disclosed, two concentrically related groups of interleaving curved plate segments, a supporting shaft for one group of segments located at the common axis of the two groups and a cam and cooperating pin associated with said shaft whereby in the rotative adjustment of said shaft the movable group of segments will be automatically bodily shifted transversely toward and away from the other group of segments, said pin being shiftable by a screw to carry the same into or out of cooperative relation with the cam.

7. A variable electrical condenser comprising a base plate, a stationary condenser element consisting of a group of concentrically curved spaced plate segments, having a common axis and arranged with said axis substantially perpendicular to the general plane of the base plate, insulating means supporting said group of plates in said relation on the base plate, said plates being tapered transversely from the edges which are furthest from the base plate toward the opposite edges of the same, a movable set of concentrically curved plate segments interleaving with the stationary segments and tapered transversely from the edges nearest the base plate away from said base plate and an operating shaft for the movable set of segments journaled in the base plate on the common axis aforesaid.

8. A variable electrical condenser comprising a base plate, a shaft journaled in said base plate at right angles to the general plane of the same, a stationary set of concentrically curved plate segments supported on the back of said base plate and having a common axis substantially coincident with the axis of the shaft, said plate segments being tapered transversely in one direction substantially at right angles to the general plane of the base plate, a movable set of concentrically curved plate segments interleaving with the stationary plate segments and tapered transversely reversely to the direction of taper of the stationary plates and an arm extending substantially radially from the end of the shaft at the back of the base plate and connected with the movable set of plate segments for shifting the same with respect to the stationary set.

9. A variable electrical condenser comprising concentrically curved interleaving groups of plate segments, the longitudinally curved segments of one group being tapered transversely from one edge to the opposite edge in one direction and the longitudinally curved segments of the other group being tapered transversely from one edge to the other edge in the opposite direction and the two groups being arranged with the thicker edges outermost, connections across the backs of said outermost thicker edges, a shaft journaled at the common axis of the two groups of plate segments, an arm extending substantially radially outwardly from the end of said shaft of one of the groups of plate segments and supporting means for the other of said groups of plate segments.

10. A variable electrical condenser comprising interleaving longitudinally curved plate segments arranged in two overlapping relatively rotatable groups, the segments of the two groups being tapered transversely but the taper of one group being in the reverse direction to the taper of the other group, the curved segments in one group being tapered longitudinally in one direction and the tapered segments of the other group being tapered longitudinally in the reverse direction and means for relatively rotating the groups of segments to first carry the thinner ends of one group into overlapping relation with the thinner ends of the other group and finally, to bring the thicker ends of one group opposed to the thinner ends of the other group.

11. A variable electrical condenser comprising two groups of interleaving plates curved longitudinally concentrically about the same axis and mounted for relative rotation about said axis, the curved plates of each group having webs across the back of the group connecting the rear or outer edges of the plates and the plates of each group being tapered in cross section transversely away from said connected back edges toward the opposite free unconnected front edges of the group, the two groups being arranged with their thinner unconnected forward edges faced oppositely in overlapping relation and the thicker connected rearward edges at the outer sides of the condenser, an adjusting shaft mounted at the central axis of the two groups and an arm extending substantially radially outwardly from said shaft to one group of curved plates.

12. A variable electrical condenser comprising two groups of interleaving plates curved longitudinally concentrically about the same axis and mounted for relative rotation about said axis, the curved plates of each group having webs across the back of the group connecting the rear or outer edges of the plates and the plates of each group being tapered in cross section transversely away from said connected back edges toward the opposite free unconnected front edges of the group, the two groups being arranged with their thinner unconnected forward edges faced oppositely in overlapping relation and the thicker connected rearward edges at the outer sides of the condenser, an adjusting shaft mounted at the central axis of the two groups and an arm extending substantially radially outwardly from said shaft to one group of curved plates, the curved plates of the respective groups being tapered longitudinally in reverse directions so that in the completely meshed relation of the two groups, the thinner ends of the plates in one group will be opposed to the thicker ends of the plates in the other group.

13. A variable electrical condenser comprising interleaving concentrically curved condenser plates in two groups relatively adjustable axially of the common center of the plates, the plates of the respective groups being reversely tapered transversely in cross section, connected across the backs of their thicker edges and arranged with their unconnected thinner edges in opposition to overlap to a greater or less extent on relative axial translation of the two groups and whereby in such movements, the spacing between the plates of the two groups will be gradually increased or reduced, a shaft rotatably mounted substantially at the axis of the two groups of plates and cam means for effecting axial relative translation of the two groups, including a cam groove in the shaft and a pin engaging said groove.

In testimony whereof I affix my signature.

FRANK J. KENT.